United States Patent
Huffington

(10) Patent No.: US 7,069,109 B2
(45) Date of Patent: Jun. 27, 2006

(54) SYSTEMS AND METHODS OF USING MULTIPLE MICROCONTROLLERS FOR FAIL-SAFE CONTROL AND ENHANCED FEATURE OPERATION OF AN APPLIANCE

(75) Inventor: Jeff Huffington, Peachtree City, GA (US)

(73) Assignee: E.G.O. North America, Inc., Newnan, GA (US)

( * ) Notice: Subject to any disclaimer, the term of this patent is extended or adjusted under 35 U.S.C. 154(b) by 59 days.

(21) Appl. No.: 10/985,107

(22) Filed: Nov. 9, 2004

(65) Prior Publication Data

US 2006/0100718 A1 May 11, 2006

(51) Int. Cl.
*G06F 19/00* (2006.01)
(52) U.S. Cl. .......................... 700/211; 700/19; 700/20; 700/23; 700/17; 700/83; 700/207; 700/21; 126/19; 126/20; 126/21; 126/22; 126/39; 219/391; 219/413; 219/414; 236/46
(58) Field of Classification Search ............ 700/1, 700/19, 20, 21, 23, 17, 83, 207, 211; 219/391, 219/413, 414; 126/19, 20, 21, 22, 39; 236/46
See application file for complete search history.

(56) References Cited

U.S. PATENT DOCUMENTS

| | | | | |
|---|---|---|---|---|
| 4,367,387 A | * | 1/1983 | Tachihara et al. ........... | 219/719 |
| 4,410,329 A | * | 10/1983 | Blevins et al. ................. | 8/158 |
| 4,816,647 A | * | 3/1989 | Payne ................... | 219/448.12 |
| 5,786,996 A | | 7/1998 | Vitkus et al. | |
| 5,946,210 A | * | 8/1999 | Montminy et al. ........... | 700/97 |
| 6,201,997 B1 | | 3/2001 | Giers | |
| 6,873,876 B1 | * | 3/2005 | Aisa ............................. | 700/86 |
| 2002/0032491 A1 | * | 3/2002 | Imamura et al. .............. | 700/79 |
| 2005/0091063 A1 | * | 4/2005 | Bergemann et al. ........ | 704/275 |

OTHER PUBLICATIONS

LIN Consortium, LIN Specification Package, Specification Document, Sep. 23, 2003, pp. 1-19, Revision 2.0, LIN Consortium, Munich, Germany, www.lin-subbus.org.
LIN Consortium, LIN Node Capability Language Specification, Specification Document, Sep. 23, 2003, pp. 1-11, Revision 2.0, LIN Consortium, Munich, Germany, www.lin-subbus.org.
LIN Consortium, LIN Protocol Specification, Specification Document, Sep. 23, 2003, pp. 1-23, Revision 2.0, LIN Consortium, Munich, Germany, www.lin-subbus.org.
LIN Consortium, LIN Diagnostic and Configuration Specification, Specification Document, Sep. 23, 2003, pp. 1-16, Revision 2.0, LIN Consortium, Munich, Germany, www.lin-subbus.org.

(Continued)

*Primary Examiner*—Ramesh Patel
(74) *Attorney, Agent, or Firm*—Alston & Bird LLP

(57) ABSTRACT

Multiple microcontrollers are used in controlling operation of an appliance thereby providing enhanced safety. User input deactivating the appliance is received and processed by a first and second microcontrollers, which separately and independently act to remove power from the appliance upon receipt of user input. Failure of one microcontroller in processing user input does not result in the appliance entering into an unsafe mode. Further, a third processor in a power supply module is used to control power into, and out of, the power supply module, so that under certain conditions, power may be remove from the system entirely or to certain components.

47 Claims, 4 Drawing Sheets

OTHER PUBLICATIONS

LIN Consortium, LIN Physical Layer Specification, Specification Document, Sep. 23, 2003, pp. 1-12, Revision 2.0, LIN Consortium, Munich, Germany, www.lin-subbus.org.

LIN Consortium, LIN Application Program Interface Specification, Specification Document, Sep. 23, 2003, pp. 1-28, Revision 2.0, LIN Consortium, Munich, Germany, www.lin-subbus.org.

LIN Consortium, LIN Configuration Language Specification, Specification Document, Sep. 23, 2003, pp. 1-16, Revision 2.0, LIN Consortium, Munich, Germany, www.lin-subbus.org.

* cited by examiner

SYSTEMS AND METHODS OF USING MULTIPLE MICROCONTROLLERS FOR FAIL-SAFE CONTROL AND ENHANCED FEATURE OPERATION OF AN APPLIANCE

This invention pertains to using multiple microcontrollers for controlling the operation of an appliance. Specifically, use of multiple microcontrollers are disclosed to ensure fail-safe operation of an electric cooking appliance.

BACKGROUND OF THE INVENTION

The basic function performed by many household kitchen appliances has remained the same for many decades. Cooktops, stoves, and ovens heat food in various ways using various heat generating components. While some basic aspects have remain largely unchanged, many of the systems associated with controlling the basic functions of these appliances has become more sophisticated. The control systems have been traditionally based on electro-mechanical components, such as timers, relays, and mechanical switches. As a result, electro-mechanical control systems are well known and have matured into a low cost technology. However, such systems are limited in their functionality and cannot be easily adapted to control new features without total system redesign.

The advent of low cost microcontrollers, typically costing a few dollars, can typically perform the function of several dedicated components and also provide the flexibility of allowing adapting the control system for new features as they are developed. Thus, use of microcontrollers is becoming prevalent in appliances. The ability to provide more features provides a marketing advantage that consumers may find useful by providing greater convenience, safety, and energy savings.

The microcontroller is essentially a microprocessor adapted for control type applications. Typically, the microprocessor incorporates circuitry for performing additional functions, such as enhanced I/O, control, and detection, frequently used in controlling a device. The incorporation of these functions avoids using additional components in conjunction with a microprocessor. However, whether a microprocessor or a microcontroller is used, each can be viewed as an equivalent to the other, to a certain degree, and, no distinction is intended between the two terms.

Various safety requirements are defined and documented by ANSI (American National Standards Institute), Underwriter's Laboratories (UL), or other industry safety groups pertaining to kitchen appliances, including cooktops, stoves, and ovens. One such safety requirement is that mechanisms must prevent the unexpected application of power to a heating element. For example, at least two user actions are required to turn on a heating element and in many implementations, a user may have to both depress a control knob while simultaneously turning the knob in order to activate a heating element. In contrast, turning off a heating element should require only one action (e.g., turning the knob without requiring any depression of the knob). These requirements are fulfilled by appropriately designed control valves or rotary switching designs.

However, other appliance designs involving a microcontroller typically use digital input devices, such as touch panels, keypads, switch inputs, etc. Thus, the traditional electro-mechanical control devices may not be present. In such embodiments, the safety requirement of receiving two user selections or actions to activate a heating element must be redesigned for a digital microcontroller environment.

Other safety requirements pertain to defining fail-safe modes of operation. A fail-safe mode of operation ensures that the failure of a single component in the appliance does not result in the appliance entering into an unsafe mode of operation. Thus, failure of a single device, such as the microcontroller, should not inadvertently result in a heating element being turned on. Similarly, when a heating element is on, failure of the microcontroller should not prevent the user from turning off the heating element.

Thus, regardless of the state of the appliance, failure of the microcontroller should not result in unsafe operation of the appliance. Because application of a microcontroller to control operation of the appliance provides greater flexibility, the possibility of microcontroller failure must be accounted for in each any every operating state of an appliance. Thus, even though solid state devices may be more reliable or have a longer life than analog electro-mechanical counterparts, defining all the fail-safe modes of operation can be complicated by using a microcontroller and needs to be designed into the system.

Once such strategy for achieving fail-safe operation has been to duplicate the microcontroller. This is disclosed in U.S. Pat. No. 6,201,997 entitled "Microprocessor System for Safety-Critical Control Systems." That patent discloses two synchronously operated processors receiving the same input data and processing the same software (e.g., control program) in which comparators check the output signals of both processors and issue disconnecting signals in the event of non-correlation between the control signals of the two processors. In essence, a totally redundant microprocessor executing the same program is deployed and inconsistent signals from the two microprocessors is deemed to be a failure condition. It is not clear how the comparators can, without any intelligence, determine which processor is failing. This architecture requires each processor to be fully duplicated and execute the same exact control program. This can provide complexity to the control program as each type of failure condition must be accounted for. Further, a software bug in one processor will, by definition, also be present in the other processor. The use of dual microprocessors in this scheme does not necessarily enhance reliability or provide flexibility.

Another approach involving using multiple microprocessors is disclosed in U.S. Pat. No. 5,786,996, entitled "Appliance Control Circuit Comprising Dual Microprocessors For Enhanced Control Operation And Agency Safety Redundancy and Software Application Method Thereof. That patent discloses using dual microprocessors in a master-slave relationship where each processor receives the same user inputs, but where the processors are not executing the same control program. In one embodiment, the master microprocessor controls the system and communicates with the second microprocessor, which monitors safety functions. Each microprocessor controls a separate switch connected serially to a switch or relay, so that if either microprocessor opens the switch, power is removed from the heating element of the appliance. Thus, both microprocessors are required to be functional and generate signals in order for power to be applied to the heating element. The dual microprocessors must communicate with each other, typically every ⅛ of a second and must coordinate their processing of data. For example, the patent discloses that "the master transmitter will advise the slave transmitter/receiver whether the operator has pressed a key indicating a particular operation and whether the system is in a power up state." (U.S. Pat. No. 5,786,996, col. 5, lines 61–64.) This type of communication requires coordination of timing between the two microprocessors as evidenced by the common zero-crossing timing input (line 46 of FIG. 2).

These references disclose using two microprocessors for enhanced safety and control. However, these references do not disclose an architecture where two or more microprocessors can be used, nor do they disclose an architecture using independent or semi-independent microprocessors. Specifically, they disclose microprocessors whose operation is coordinated and dependent on each other—either by running another microprocessor as an exact duplicate component (including the software), or a master microprocessor constantly communicating with a single slave microprocessor to constantly update status information. While this type of coordination may be easily accomplished if the entire system is designed and tested by one manufacturer, it is desirable for appliances to be modularized. This facilitates using replacement components and outsourcing the use of a component to different manufacturers. Ensuring proper operation between two tightly coupled master-slave processors can be difficult, particularly when designed and provided by different designers. Therefore, what is a needed is a modular control architecture allowing two or more microcontrollers to control operation of an appliance in which semi-autonomous operation is possible for each microcontroller in order to provide enhanced control and safety operation of the household appliance.

BRIEF SUMMARY OF THE INVENTION

In one embodiment, a system is defined for controlling an appliance incorporating at least two microcontrollers, wherein at least a first microcontroller receives input signals as a result of a user action directed to controlling a heat generating component in an appliance, the first microcontroller generating in response thereto a first signal received by a power generator module, which in turn generates a power control signal that controls the power provided to the heat generating component, and a second microcontroller also receiving the user input signals and providing a control signal which controls a switch interrupting a circuit conveying the power control signal used to control the heat generating component.

In other embodiments, the second microcontroller may instead receive other input signals rather than the user input signals. The other input signals may relate to the status of the appliance, such as current, voltage, or temperature sensors reporting the operation status of the appliance. In still other embodiments, the second microcontroller may interrupt a circuit conveying power to the heating element, rather than interrupting a circuit conveying the power control signal.

In another embodiment, a method is defined for controlling an appliance having at least two microcontrollers, where input signals resulting from user actions are received at both a first and second microcontroller, the first microcontroller generating a power control signal that controls the output of a heating element in the appliance, the second microcontroller generating a control signal that controls a switch conveying the power control signal. In other embodiments, the input received by the second microcontroller may be input signal associated with the status of the appliance instead of a input signals resulting from user actions.

The above summarizes only a few of the embodiments of the present invention, and others are defined and claimed herein. The above summary is not intended to limited in any way the scope of the invention as defined in the claims herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Figure 1:
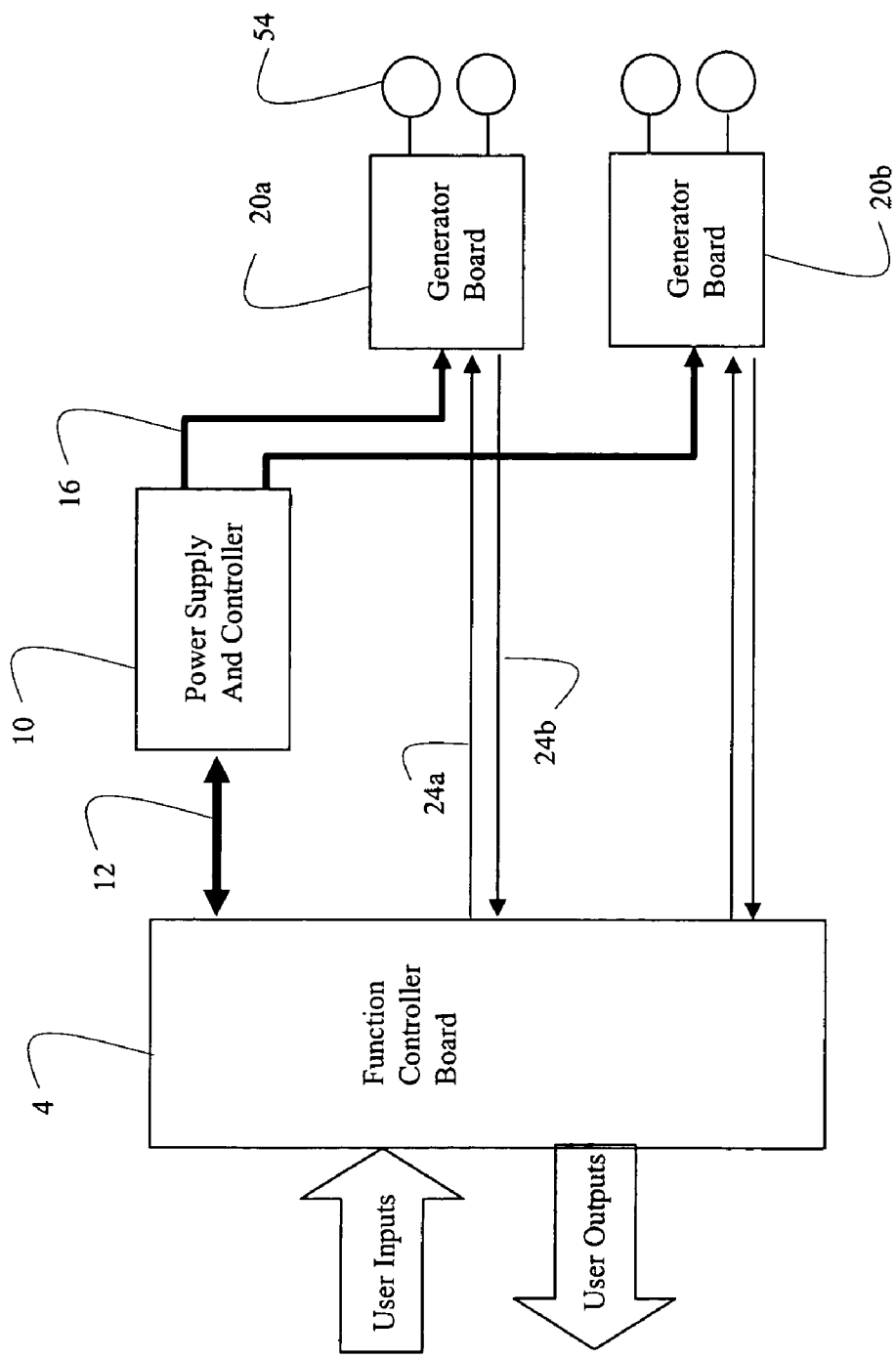
FIG. 1 illustrates one embodiment of the overall system architecture according to the principles of the present invention.

Turning to FIG. 1, a high-level view of the major components are illustrated. Typically, these components are present in a household appliance embodied in a cooktop, stove, or similar cooking appliance, typically having electrical heating elements. Although the heat generating components are disclosed as inductions coils ("coils"), any type of heat generating technology can be used, such as electrical resistance heat coils, radiant heat units, microwave generators, etc. The use of the term "heating element" or "heat generating component" should not be interpreted as being limited to any particular technology, electrical or otherwise. The principles of the present invention can be applied to any type of heat generating component, regardless of its nature of operation, whether it be based on heating by induction, radiant heat, microwave, convection, etc.

FIG. 1 also illustrates a modular system allowing certain components to be easily upgraded, replaced, outsourced, or provided by various third-party suppliers, all the while ensuring that fail-safe operation is maintained. This is in contrast to earlier appliance control that were designed as a monolithic and integrated system The overall system typically comprises three different types of modules. Because of the modular design, each module is typically implemented using a printed circuit board (PCB), hence a module can also be referred to as a "board." While there are three types of boards, one type of board may be replicated in a typical appliance. Thus, a typical cooking appliance incorporates a total of four boards. In FIG. 1, the function controller board 4 provides overall control of the system, based on user inputs and system status. In addition, the function controller board provides feedback to the user. The inputs may be in various forms, including those disclosed in Directionless Rotary Encoder Control System For A Household Appliance, U.S. patent application Ser. No. 10/910,187, filed on Aug. 12, 2004, and incorporated herein by reference. Similarly, the feedback to the user may be of various forms, including those disclosed in Systems And Methods For Providing Variable Output Feedback To A User Of A Household Appliance, U.S. patent application Ser. No. 10/910,187, filed on Aug. 2, 2004, and incorporated herein by reference.

The function controller board can be considered the "brain" of the system and it typically incorporates a primary microcontroller to control the system. The function controller board interacts with a power supply, filter, and controller board 10 ("power board"). The power board receives household power (e.g., nominally 120 or 240 volts) and provides power 16 as required to the various components. The power board 10 communicates with the function controller board 4 using a message based protocol (the "LIN" protocol) over a serial communications bus 12 (the LIN bus).

FIG. 1 also discloses that the function controller interacting with two power generator boards 20*a* and 20*b* ("generator board"). Each generator board provides direct control of two electric cooking elements 54. In this embodiment, the cooking elements 54 are induction based, which generate heat in ferrous-based cooking utensils based on a changing magnetic field. As noted, other embodiments of the invention may use other heat generating components, such as radiant heat, traditional resistance-based heating coils, or combination thereof. Typically, a cooktop has four cooking elements and a second generator board 20*b* is typically present. This architecture provides a modular design allowing manufacture of compact cooking appliances having two cooking elements, or larger cooking appliances having six or more cooking elements, all of which are based on using the types of modules disclosed herein. Because operation of each generator board is typically identical, the discussion herein focuses only on a single generator board.

The generator board 20*a* receives power and control commands from the power supply board 10 over another communication bus 16, which is also based on the LIN protocol. The generator board 20*a* also interacts in a limited manner with the function controller board 4. Specifically, circuits 24*a* and 24*b* are 'backhauled' from the generator board to the function controller board 20*a* where the safety microcontroller 8 can open or close the circuit using a switch of some form. Normally, the function controller board maintains a normally-closed connection between the two circuits (e.g., the relay switch is normally-closed). As will be discussed, in certain circumstances the function controller board may interrupt the circuit to ensure safe operation of the system.

The nature of the power control signal generated by the power generator board and passing through the relay is not known by the safety microcontroller 8. The power control signal may be a message based protocol, a binary control signal, or a periodic square wave. Even the voltage or current levels are not known by the safety microcontroller. Thus, the safety microcontroller can be easily compatible with any number of schemes in which the generator board 20 controls the individual heating elements. Thus, regardless of whether the generator board uses a power control signal comprising a pulse wave of a given frequency to activate a heating element at a certain level, or provides a power control signal comprising a variable voltage level to indicate activation of a heating element at a certain level, the safety microcontroller can easily provide a fail safe mode by interrupting the circuit conveying the power control signal. Typically, the power control signal is a signal controlling power to the induction heating element, as opposed to the power itself provided to the heating element. In other embodiments, the circuit may convey power itself as opposed to a power control signal. Because a power control signal is typically switched by the control signals from the safety microcontroller as opposed to power, the wattage, voltage and cost associated with the specification of the relay 21 is impacted. Further, in some embodiments, it is desirable that 120v power is not switched or present on the function controller board 4 and that only low level voltages are present.

Figure 2:
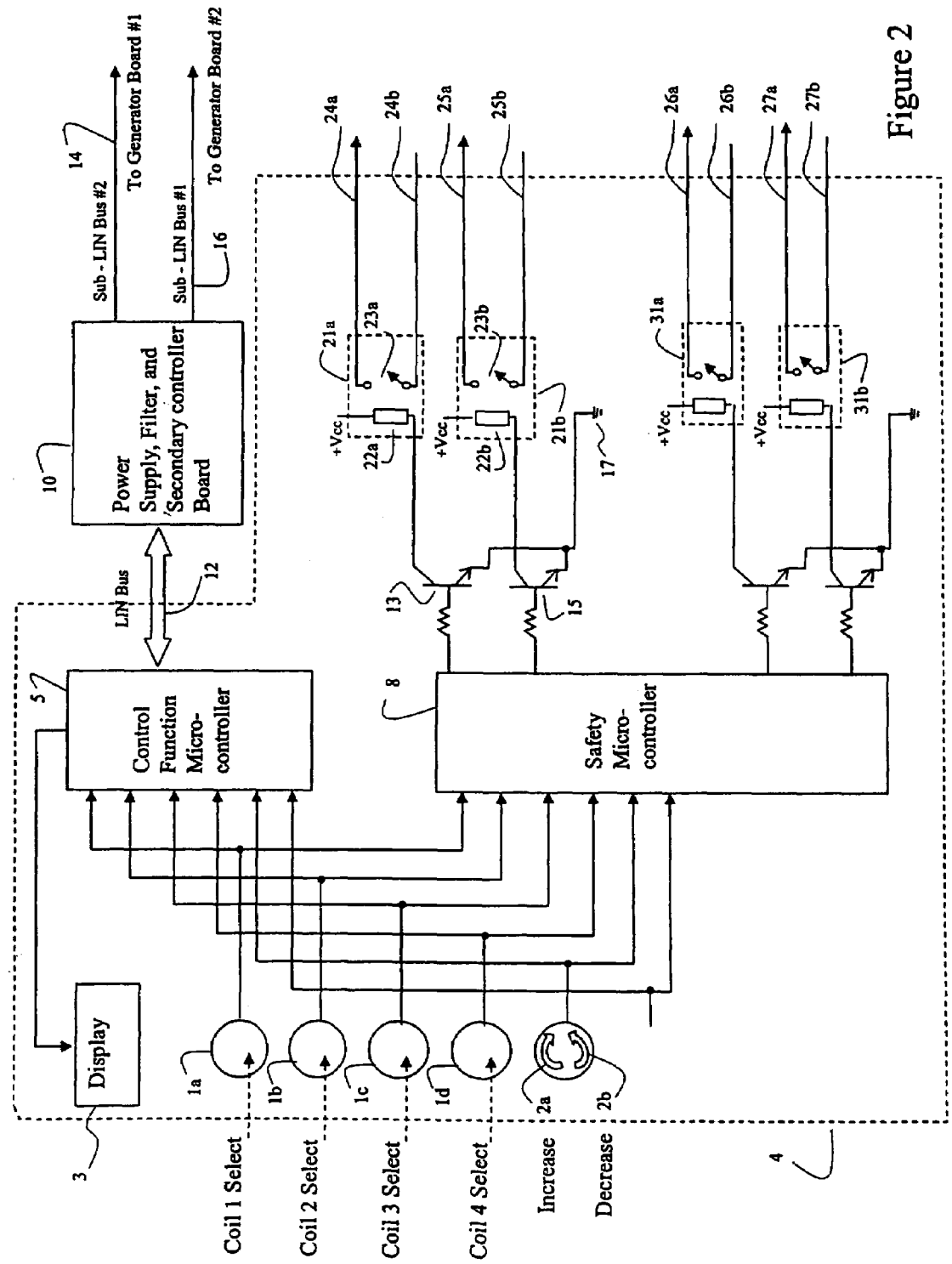
FIG. 2 illustrates one embodiment according to the principles of the present invention wherein a safety microcontroller provides fail-safe, power shut-off signals.

The function controller board is further illustrated in FIG. 2. In FIG. 2, the various components are illustrated as being co-located on a common PCB board 4. Other configurations are possible, where certain components may be located on other boards for convenience or for other design considerations.

The function controller board typically interacts with the user, including receiving input and providing feedback. In this embodiment, a display 3 provides visual feedback to the user, potentially including: alphanumeric indications of user selections, temperature, selected functions, and operational status. The display itself can be of various technologies, including LED displays, discrete LEDs, LCD displays, or other types. Other user feedback mechanisms, may be incorporated, such as audible feedback, discrete status indicators, etc. The display is operatively controlled by a microcontroller 5.

The function controller board also receives user inputs, which are illustrated as four individual user inputs for selecting one of four heating elements 1*a*–1*d*, which in this embodiment are induction heating elements or "coils." A separate input control 2 is shown for adjusting the desired output level. In this embodiment, rotation in one direction increases the output of a selected coil 2*a* and rotation in the other direction 2*b* decreases the output of the selected coil. In other embodiments, each coil has an individual input, such as a selector and adjuster, and/or individual feedback indicators. Those skilled in the art will readily recognize that a variety of input/output technologies and configurations can be used.

Each user input control provides a user input signal to the control function microcontroller. The control function microcontroller processes the user input signal, provides the appropriate display response, and communicates the appropriate commands over a LIN bus 12 to the power board. The LIN bus is a low-cost, low speed LAN, originally developed for automotive applications, which has been adapted for appliance control system communications. Although use of a LIN bus is disclosed, many other types of signals can be generated to control the power levels provided by the generator board to the heating element.

In summary, the control function microcontroller 5 serves as the main controller for the system, executing software defining what functions the user can invoke. The function microcontroller 5 sends commands over the LIN bus to the power supply board 10, which in turn provides power, and issues commands, to the appropriate generator board 20a. The power supply board issues commands using two separate LIN buses 14, 16, one bus for each generator board, to activate the appropriate heating element.

The safety microcontroller 8 typically receives the same user input signals as the control function microcontroller 5. The safety microcontroller's function is to ensure fail-safe operation. In other words, the safety microprocessor ensures that if there is a failure in the control function microcontroller, the appliance will fail in a safe mode. Specifically, the safety microcontroller ensures that the heating elements can be deactivated even if the control function microcontroller is unable to process a user input signal. Thus, if a user input deactivates a heating element (e.g., turns off coil #1 by providing the appropriate input) resulting in generating a deactivation signal that is received by both the control function microcontroller 5 and the safety microcontroller 8, the safety microcontroller 8 ensures that the heating element is deactivated even if the control function microcontroller 5 fails to operate on the input signal.

In FIG. 2, the safety microcontroller 5 is shown as receiving the same user inputs as the control function microcontroller 8. In other embodiments, the safety microcontroller may also, or instead of, receive other inputs (e.g., non-user input signals) that can be received by the control function microcontroller. For example, the control function microcontroller may receive a signal from a temperature sensor (not shown), which occurs in oven-based embodiments. Thus, the control function microcontroller may monitor the temperature and invoke a fail-safe procedure if the temperature reaches a certain limit. Similarly, the safety microcontroller may also receive the same signal from the temperature sensor and also invoke certain procedures if the temperature reaches a certain level as a backup measure. This action may occur only if the control function microcontroller fails to respond, or may occur independently of whether the control function microcontroller does respond.

For several reasons, the software executed on the control function microcontroller is typically not the same software on the control function microcontroller. First, the safety microcontroller may not be the same brand or type as the control function microcontroller and may incorporate different instruction commands. By not requiring the same exact software to be executed on each controller, different microcontroller capabilities for each microcontroller can be utilized. This allows a lower cost microcontroller to be potentially used for the safety microcontroller. Further, if a software problem causes a failure in one type of microcontroller, then executing the same software on an identical microcontroller might replicate the problem, rather than allow fail-safe operation. Further, even though the control microcontroller may be altered or customized to reflect differences in the operation of a particular appliance, a single safety microcontroller and software routine could be used with different versions of the control function software. Thus, it is preferable that the safety microcontroller does not execute an exact copy of the software executed by the control function microcontroller.

In addition, it may be desirable not to design the safety microcontroller as a slave to the control function microcontroller. If the two microcontrollers are in a master-slave relationship, then the software executing in the control function microcontroller has to be designed, developed, and tested to interoperate properly with the software with the safety microcontroller. By avoiding a master-slave architecture, a degree of independence in the design, development, and testing can be maintained between the microcontrollers.

Thus, a degree of independence and flexibility can be achieved by using the safety microcontroller as a separate, but redundant means, for providing fail safe operation with respect to the function controller microcontroller. However, this does not preclude designing such coordination between the operation between the two microcontrollers.

Upon detecting a user input signal for deactivating a heating element, the safety microcontroller initiates a control signal controlling opening or closing a circuit conveying the power control signal generated by the power generator board for the appropriate heating element. The circuits being interrupted typically convey power control signals, as opposed to power itself for the heating element; however some embodiments may interrupt the power provided to the heating element.

Turning to FIG. 2, one such typical circuit is disclosed. In this instance, the circuit being interrupted is shown as line 24. This can be viewed as an input 24b to a relay 21a which becomes an output 24a from the same relay. The circuit is controlled by a switch 23a in the relay which is typically incorporates a magnetic coil 22a. The magnetic coil is controlled by a transistor 13, which in turn, is controlled by an output of the safety microcontroller 8. In operation, when the output of the microcontroller goes high and biases the transistor 13, the transistor turns 'on' and conducts current through the coil 22a of the relay 21a thereby opening the switch 23a. In other embodiments, the relay or circuit may be normally open, in which case the signal from the microcontroller closes the switch.

Although a mechanical relay is shown, those skilled in the art will readily appreciate that alternatives to a mechanical relay can be used, such as opto-isolators, solid state transistors, etc. Typically, cost, reliability, regulatory concerns, and component availability impact the selection of which type of component or switching means are used to interrupt a circuit. However, all these perform the same function of controlling the opening/closing a circuit based on a signal generated from the safety microcontroller.

The relays 21a, 21b, 31a, 31b are illustrated as being co-located on the function controller board 4. Although a pair of relays could be located on a generator board, the disclosed arrangement provides flexibility by allowing a generic generator board to be easily adapted for use with different types of function controller boards, but still allowing fail-safe operation to be controlled by the function controller board. This does require a connector for each circuit, which is typically a two or four wire connector.

Figure 3:
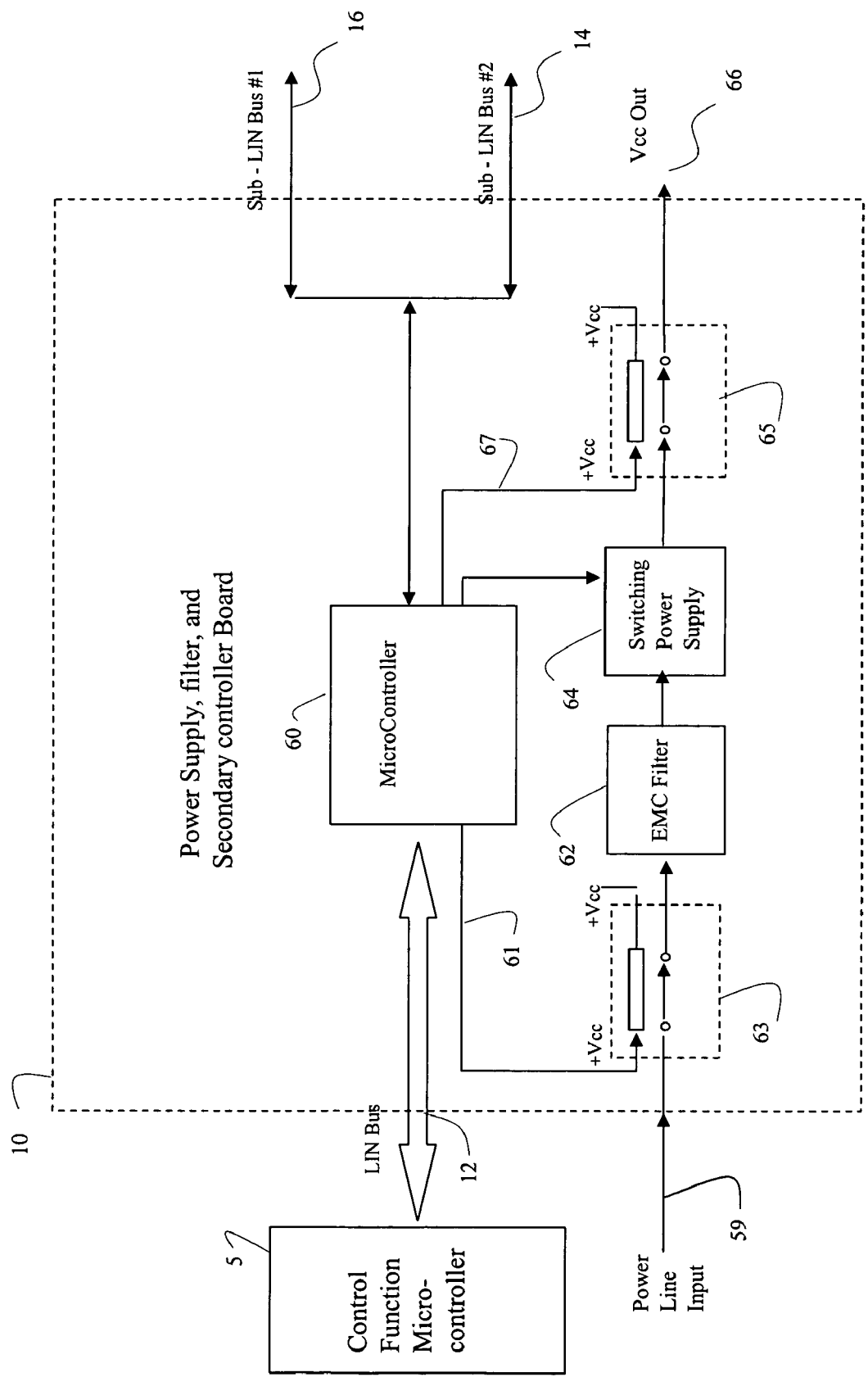
FIG. 3 illustrates one embodiment according to the principles of the present invention wherein a control microcontroller communicating using a LIN bus also provides fail-safe power-shut-off signals.

Turning now to FIG. 3, the power board is disclosed in further detail. As previously indicated, the power board 10 interfaces with the control function microcontroller 5 using the LIN bus 12. The power board receives LIN-based messages indicating which heating element is controlled, and the power board does this by generating additional messages over the appropriate sub-LIN bus #1 16 or sub-LIN bus #2 14 to the appropriate generator board. These messages may, or may not, be structured in the same manner as the messages used to communicate with the control function microcontroller 5. As previously noted, the signals may be in other forms rather than message based, and can be various periodic, time varying, voltage varying or other modulated signals.

The power board 10 also receives input power from a household power source 59, typically based on a nominal 120v or 240v line voltage. The power supply board includes an electromagnetic compatibility filter 62 and a switching power supply 64.

The power supply board also incorporates two relays 63, and 65. One relay 63 controls the input power while the other relay 65 controls the output power. Although both relays are illustrated, some embodiments may only incorporate one relay. Both relays are controlled by the power board microcontroller 60 that manages various power related functions. The microprocessor can also control a switching power supply so as to reduce the power consumption of the overall system, consistent with that disclosed in Systems And Methods For Achieving Low Power Standby Through Interaction Between A Microcontroller And A Switching Mode Power Supply, application Ser. No. 10/854,733, filed on May 26, 2004, and incorporated by reference herein.

The power board microcontroller may receive other inputs (not shown) regarding the operation of the power board, and send a signal to either relay (or both) to control the input power 63 or the output power 65. For example, when the appliance is in a dangerous state, or receiving commands deemed to be unsafe, the microcontroller 60 could disable the other microcontrollers or boards by interrupting the circuit providing Vcc power via relay 65. This, of course, presumes that the power board microcontroller itself still receives power so that it can operate. However, if a normally open relay is used, then microcontroller 60 could 'deactivate itself' by removing the signal to the input relay 63 thereby removing input power and ensuring that failure occurs in a safe mode. These types of techniques can be used by the power board to deactivate power to other components, or to the entire system, if conditions warrant.

Figure 4:
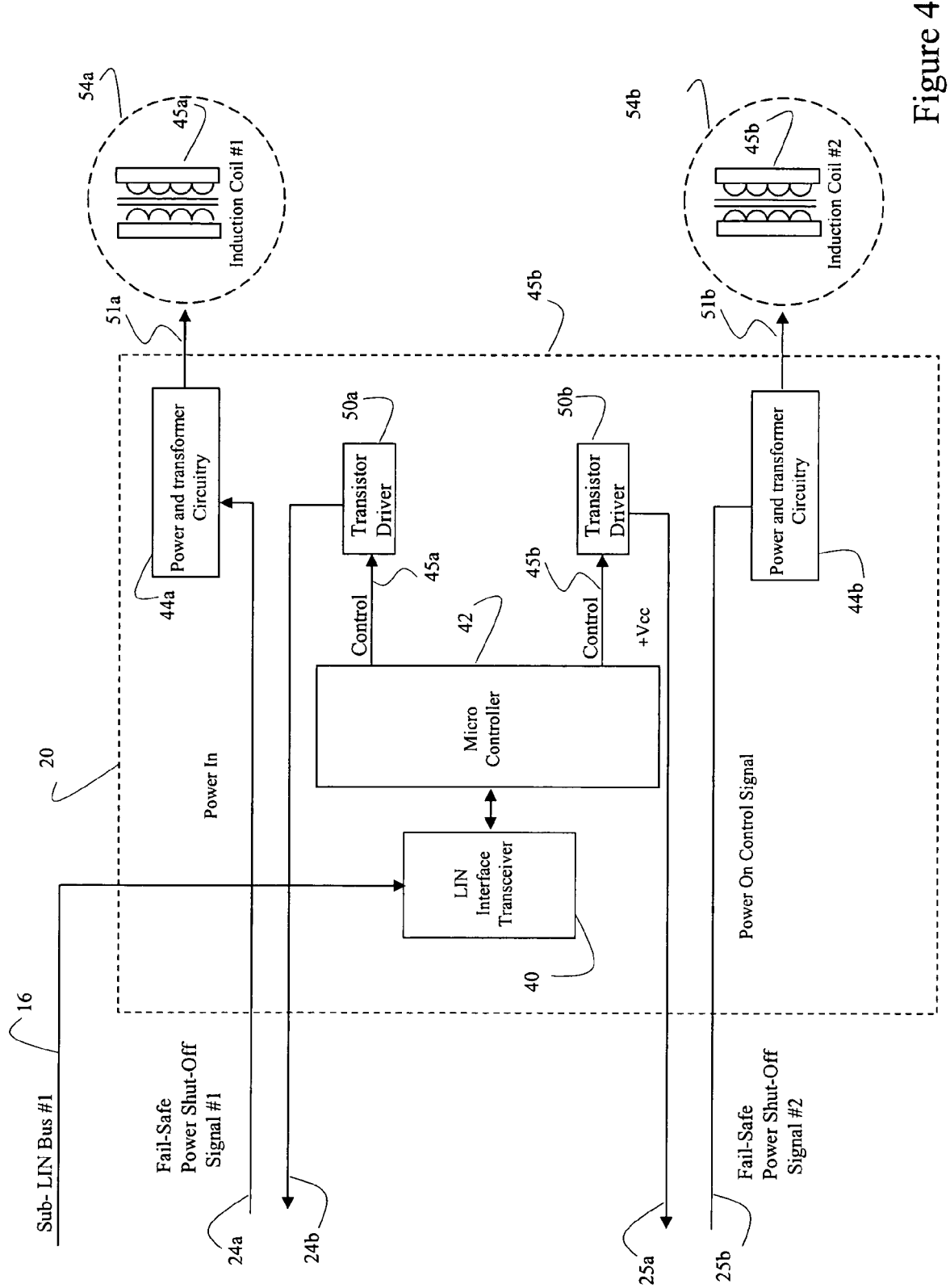
FIG. 4 illustrates another embodiment according to the principles of the present invention wherein a generator control microprocessor provides power control signals subject to fail-safe operation.

Turning now to FIG. 4, the generator board 20 is disclosed in further detail. The generator board 20 communicates using the sub-LIN bus 16 with the power board. The sub-LIN bus is terminated by the LIN interface transceiver 40, which in turn communicates with a microcontroller 42. Alternatively, the LIN interface functionality could be directly incorporated into the microcontroller 42. The generator board microcontroller 42 receives messages that are sent primarily in response to the user indicating a desired action controlling the power that is to be applied to a particular heating element. In this embodiment, there are two heating elements controlled 54a, 54b by the generator board 20. Each heating element contains induction circuitry 45a, 45b for generating heat in a cooking utensil, although, as previously noted, other types of heating elements could be used.

The microcontroller 42 provides two output signals 45a, 45b, that are each received by transistor driver circuitry. Because the microcontroller output signals are limited in power, the output is provided to transistor driver circuitry 50a, 50b that provide a suitable power control signal for controlling the power and transformer circuitry 44a, 44b. The means for indicating various power levels to the power and transformer circuitry 44a, 44b can be a modulated wave signal, an amplitude modulated wave signals, a discrete level signal, etc. The transistor drivers 50a, 50b control the power and transformer circuitry 44a, 44b via the circuits indicated by lines 24a, 24b and 25a, 25b, which in turn are connected to, and pass through, the relay shown in FIG. 2.

During normal operation, the generator board microcontroller 42 provides a power control signal that is received by the transistor driver 50a and in turn leads to the input of relay 21a of FIG. 2. In FIG. 2, the relay 21a is normally closed when the unit is in operation, so that the power control signal continues to the output 24a of the relay 21a, back to the input of the power and transformer circuitry 44a of FIG. 4. The power and transformer circuitry then provides the power as appropriate to the induction unit 54a.

When the user desires to shut off power to the induction heating element through manipulation of input 1a in FIG. 2, the safety microcontroller 8 of FIG. 2 receives the user input signals as does the function controller microcontroller 5. The safety microcontroller 8 generates a control signal that controls the relay 21a so as to open up the circuit between input 24b and 24a, thereby interrupting the power control signal to the power and transformer circuitry 44a. In this manner, the power control signal is interrupted and the power and transformer circuitry 44a deactivates the induction 54a even if the function controller microcontroller 5 in FIG. 2 fails to properly deactivate the heating element.

The means by which the safety microcontroller opens the relay for the respective burner can be based on the processing of user inputs and/or sensing conditions which are determined to be hazardous. For example, a temperature sensor may be employed so that the safety microprocessor activates the relay to interrupt the power control signal if an unsafe temperature is observed. Alternatively, various other types of sensing circuitry could be employed, such as detecting current or voltage levels, which trigger the safety microcontroller to open up one or more relays. In other embodiments, a timer may be employed so that a heating element that has been activated for a certain time, without having any user input (e.g., 24 hours), is presumed to have been accidentally left on, and the safety microcontroller will deactivate the relay, thereby deactivating the heating element. In still other embodiments, the safety microcontroller could monitor the LIN bus to determine whether an appropriate command is issued to deactivate the heating element, or the safety microcontroller could interrogate the generator board microcontroller to verify that the appropriate heating element is deactivated. A variety of schemes can be used to trigger the safety microcontroller to interrupt the control signal to the power and transformer circuitry.

Based on the algorithms used and the desired degree of coordination between the safety microcontroller and the control function microcontroller, the safety microcontroller may notify the function controller microcontroller via a communications bus (not shown in FIG. 2) that a particular relay has been opened, as well as potentially indicating the circumstances which triggered the action (e.g., normal operation, too high of a temperature detected, timer expired, etc.). This would allow the function controller microcontroller to report error conditions to a user via the display.

Similarly, the microcontroller 60 of FIG. 3 could also incorporate sensors or circuitry for detecting a potentially unsafe condition and opening up the relays 63, 65 is response to detecting unsafe temperature conditions.

Those skilled in the art will readily appreciate that variations of the embodiments illustrated are possible. It should be emphasized that the above-described embodiments of the present invention are merely possible examples of various embodiments to set forth a clear understanding of the principles of the invention. For example, various functions could be combined or reallocated among the different modules. Thus, for example, the microcontroller 60 on the power board and the microcontroller 42 on the generator board could be implemented using a single microcontroller. Further, the placement of components could be on a single board, or on boards other than those disclosed.

Any variations and modifications may be made to the above-described embodiments of the invention without departing substantially from the spirit of the principles of the invention. All such modifications and variations are intended That which is claimed:

1. A system for controlling a kitchen cooking appliance comprising:
a first microcontroller executing a first program, the first microcontroller receiving a user input signal for controlling operation of the kitchen cooking appliance, the first microcontroller providing a first power control signal to vary the amount of power provided to a heating element in the kitchen cooking appliance;
a second microcontroller executing a second program, the second microcontroller receiving the user input signal, the second microcontroller providing a control signal;
a power generator module receiving the first power control signal from the first microcontroller and providing the power over a circuit to the heating element, the amount of the power provided to the heating element determined by the first power control signal; and
a switching element receiving the power control signal from the second processor capable of interrupting the circuit providing the power to the heating element.

2. The system of claim 1 wherein the switching element is a transistor.

3. The system of claim 1 wherein the switching element in a relay.

4. The system of claim 1 wherein the first power control signal is a square wave having a periodic frequency.

5. The system of claim 1 wherein the power provided to the heating element is based on a nominal household voltage of either 120 volts or 240 volts.

6. The system of claim 1 wherein the control signal has two voltage levels, wherein one level causes the interruption of the circuit providing the power to the heating element.

7. A system for controlling an appliance comprising:
a function controller module comprising:
a first microcontroller executing a first program, the first microcontroller receiving a user input for controlling operation of the appliance, the first microcontroller providing a first power control signal to vary the amount of power provided to a heat generating component in the appliance; and
a second microcontroller executing a second program, the second microcontroller receiving a status input signal associated with the status of the appliance, the second microcontroller providing a fail-safe control signal in response to the status input signal;
a power generator module receiving the first power control signal from the first microcontroller and providing in response a second power control signal to vary the amount of power provided to the heat generating component; and
a switch receiving the fail-safe control signal from the second processor and interrupting a circuit conveying the second power control signal.

8. The system of claim 7 wherein the status input signal is associated with detecting a voltage level.

9. The system of claim 7 wherein the status input signal is associated with detecting a current level.

10. The system of claim 7 wherein the status input signal is associated with detecting a temperature level.

11. The system of claim 10 wherein the temperature level is associated with the heat generating component.

12. The system of claim 10 wherein the temperature level is associated with an oven.

13. The system of claim 7 wherein the fail-safe control signal removes power provided to the heat generating component in the appliance.

14. The system of claim 13 wherein the fail-safe control signal has one of two operating voltages.

15. The system of claim 7 wherein the first program is written using a different microcontroller instruction set than the second program.

16. A system for controlling an appliance comprising:
a function controller module comprising:
a first microcontroller executing a first program receiving a user input directed to the control of the appliance, the first microcontroller providing a first power control signal to vary the amount of power provided to a heating generating component in the appliance; and
a second microcontroller executing a second program, also receiving the user input directed to the control of the appliance, the second microcontroller providing a control signal;
a power generator module receiving the first power control signal from the first microcontroller and providing in response a second power control signal to vary the amount of power provided to the heat generating component; and
a switching means receiving the control signal from the second processor and interrupting a circuit conveying the second power control signal.

17. The system of claim 16 further comprising
a display operatively controlled by the first microcontroller presenting data to a user regarding the amount of power provided to the heat generating component.

18. The system of claim 16 further comprising a keypad for the user to provide input regarding a desired level of power provided to the heat generating component.

19. The system of claim 16 wherein the first power control signal comprises LIN-based protocol messages.

20. The system of claim 19 wherein the second power control signals comprises a modulated signal.

21. The system of claim 16 wherein the switching means comprises a relay.

22. The system of claim 16 wherein the switching means comprises a transistor.

23. The system of claim 16 wherein the switching means comprises an opto-isolator.

24. The system of claim 16 wherein the heat generating component is one from the group comprising an induction element, radiant heat coil, and resistance heating element.

25. The system of claim 16 wherein the power supply module incorporates a switching power supply.

26. The system of claim 16 further comprising an opto-isolator disposed between the second microcontroller and the power supply module to provide opto-isolation of the signal from the second microcontroller to the power supply module.

27. The system of claim 16 further comprising a relay disposed between the second microcontroller and the power supply module to transfer the second power control signal.

28. The system of claim 16 wherein the second microcontroller generates the control signal thereby completing the circuit conveying the second power control signal.

29. The system of claim 16 wherein the second microcontroller generates the control signal thereby interrupting the circuit conveying the second power control signal.

30. The system of claim 16 wherein the first program is a software routine comprising a program that is different from the second program.

31. A method of operating an appliance comprising the steps of:
   receiving an input signal from an input device of a household cooking appliance at a first microcontroller executing a first control program, the input signal indicating a change in the operation of a heating element in the appliance;
   generating a first power control signal from the first microcontroller, the first signal controlling the amount of power provided to the heating element;
   receiving the input signal at a second microcontroller executing a second control program;
   generating a control signal at the second microcontroller, the control signal controlling a circuit conveying the first power control signal; and
   interrupting the circuit conveying the first power control signal thereby removing power to the heating element.

32. The method of claim 31 wherein the first power control signal actuates a relay controlling the circuit conveying the first power control signal.

33. The method of claim 32 wherein the user input signal indicates deactivation of the heating element and the actuating of the relay comprises interrupting the circuit.

34. The method of claim 31 wherein the first power control signal is a time varying periodic signal.

35. The method of claim 31 wherein the second microcontroller ascertains the status of the first microcontroller prior to generating the control signal.

36. A method for operating an appliance comprising the steps of:
   generating an input signal in response to a user action indicating a change of the operation of a heat generating component in the appliance;
   receiving the input signal at a first microcontroller executing a first program, the first microcontroller generating a first power control signal conveying one of a plurality of values associated with a plurality of heating levels associated with the heat generating component of the appliance;
   receiving the first power control signal at a power control module wherein the power control module generates a second power control signal;
   receiving the input signal at a second microcontroller, the second microcontroller executing a second program;
   generating at the second microcontroller a control signal controlling the switching a circuit conveying the power control signal; and
   the power control module altering the heating level associated with the heat generating component in the appliance in response to the first power control signal.

37. The method of claim 36 wherein the first power control signal controlling the operation of the appliance is further associated with one of a plurality of heat generating components.

38. The method of claim 36 wherein the control signal controlling the switching a circuit interrupts the circuit conveying the second power control signal to be interrupted.

39. The method of claim 38 wherein the control signal is generated in response to the input signal indicating a deactivation of the heat generating component.

40. The method of claim 38 wherein the control signal is generated in response to a temperature signal.

41. The method of claim 40 wherein the temperature signal indicates an unsafe condition of the appliance.

42. The method of claim 36 wherein the second microcontroller queries the first microcontroller prior to generating the control signal.

43. The method of claim 42 wherein the second microcontroller generates the control signal in response to the status of first microcontroller.

44. A method for operating an appliance comprising the steps of:
   generating an input signal in response indicating a change in the operation of a heat generating component in an appliance;
   receiving the input signal at a first microcontroller executing a first program, the first microcontroller generating a first message controlling the operation of the appliance;
   receiving the input at a second microcontroller, the second microcontroller executing a second program;
   generating at the second microcontroller a control signal switching a circuit conveying a power control signal; and
   altering the operation of the heat generating component in the appliance in response to the power control signal.

45. The method of claim 44 further comprising the steps of:
   receiving the first message at a third microcontroller associated with a power control module;
   selecting one of two heat generating components controlled by the power control module, the selection based on the contents of the first message;
   determining the power output control signal of the third microcontroller; and
   providing the power output control signal to the selected heat generating component.

46. A method for operating of an appliance comprising the steps of:
   generating an input signal in response to a user action indicating a change in operation of a heat generating component in an appliance;
   receiving the input signal at a first microcontroller executing a first program, the first microcontroller generating a first signal controlling the operation of the appliance;
   receiving a status input signal at a second microcontroller, the second microcontroller executing a second program;
   generating at the second microcontroller a second signal controlling a switching device controlling a circuit conveying a power control signal;
   receiving the first signal at a power module wherein the power module generates the power control signal;
   the power module altering the operation of the heat generating component in the appliance in response to the power control signal; and
   the second microcontroller altering the second signal based on the input signal, the second signal causing the switching device to interrupt the circuit conveying the power control signal.

47. The method of claim 46 wherein the input from the user indicates the heat generation component is to be deactivated and the second microcontroller generates in response the second signal.

* * * * *